United States Patent Office 3,586,704
Patented June 22, 1971

3,586,704
PROCESS FOR THE PREPARATION OF AN ALKYL NITRILE, A FATTY ACID AND A FATTY ACID AMIDE
Alan F. Ellis, Murrysville, Pa., assignor to Gulf Research & Development Company, Pittsburgh, Pa.
No Drawing. Continuation-in-part of application Ser. No. 535,700, Mar. 21, 1966. This application Dec. 9, 1968, Ser. No. 782,450
Int. Cl. C09f 1/00; C11c 1/00; C07c 121/16, 121/18; 53/00, 97/16
U.S. Cl. 260—404         14 Claims

ABSTRACT OF THE DISCLOSURE

A process is proposed for the preparation of a reaction product containing at least one compound selected from an alkyl nitrile, a fatty acid and a fatty acid amide. The process comprises reacting a 1-nitro-2-nitrosoalkane, such as 1-nitro-2-nitrosohexane, or a 1-nitroalkanone-2 oxime, such as 1-nitrohexanone-2 oxime, with aqueous sulfuric acid in which the concentration of the $H_2SO_4$ is sufficient to form a one phase reaction medium with the 1-nitro containing charge stock and, optionally, in the presence of a lower alkyl fatty acid, such as acetic acid, as a diluent. Phosphoric acid in the same concentration range can be substituted for the sulfuric acid to produce a reaction product containing at least one compound selected from a fatty acid and a fatty acid amide.

This invention relates to a process for the conversion of selected 1-nitroalkanes to a reaction product containing at least one of a fatty acid, a fatty acid amide or an alkyl nitrile.

This application is a continuation-in-part of my copending Ser. No. 535,700, filed Mar. 21, 1966, now abandoned, and assigned to the same assignee as the present application.

In accordance with the invention, an alkyl nitrile having from 2 to 24 carbon atoms is prepared by a process comprising heating a 1-nitroalkane having from 3 to 25 carbon atoms selected from the group consisting of a 1-nitro-2-nitrosoalkane having a hydrogen atom on the beta carbon atom and a 1-nitroalkanone-2 oxime in the contact presence of aqueous sulfuric acid having an $H_2SO_4$ content such that said sulfuric acid forms a one phase reaction medium with said 1-nitroalkane.

In one embodiment of the invention, a reaction product comprising at least one compound selected from the group consisting of a fatty acid having from 2 to 24 carbon atoms, or a fatty acid amide having from 2 to 24 carbon atoms is produced by reacting at least one 1-nitroalkane having from 3 to 25 carbon atoms selected from the group consisting of a 1-nitro-2-nitrosoalkane having a hydrogen atom on the beta carbon atom and a 1-nitroalkanone-2 oxime with an aqueous mineral acid selected from the group consisting of $H_2SO_4$ and $H_3PO_4$ in a reaction medium comprising said aqueous mineral acid under reaction conditions including a temperature from about 60° to about 160° C. and wherein said reaction medium the concentration of the anhydrous mineral acid content of said aqueous mineral acid is at least sufficient to form a one phase reaction medium with said 1-nitroalkane at the reaction temperature.

In one preferred embodiment of the invention, a fatty acid having from 2 to 24 carbon atoms is prepared by contacting a 1-nitroalkane having from 3 to 25 carbon atoms selected from the group consisting of a 1-nitro-2-nitrosoalkane having a hydrogen atom on the beta carbon atom and a 1-nitroalkanone-2 oxime with a reaction medium comprising an aqueous mineral acid selected from the group consisting of sulfuric or phosphoric to form a first reaction product at a temperature of between 60° and 160° C. for a time between one second and 120 minutes wherein the anhydrous mineral acid concentration of said aqueous mineral acid is at least 65 weight percent, and thereafter adding a sufficient amount of water to the reaction mixture to decrease the anhydrous mineral acid content of the aqueous mineral acid to less than 65 weight percent and heating the resulting reaction mixture at a temperature and for a time sufficient to convert said first reaction product to the desired fatty acid.

The charge stock can be any 1-nitroalkane selected from the group consisting of a 1-nitro-2-nitrosoalkane having a hydrogen atom on the beta carbon atom or a 1-nitroalkanone-2 oxime. The 1-nitroalkane suitably has from 3 to 25 carbon atoms and preferably has from 4 to 18 carbon atoms.

The monomeric 1-nitro-2-nitrosoalkanes have the formula:

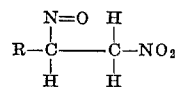

where R is a saturated alkyl radical having from one to 23 carbon atoms.

The preferred 1-nitroalkanone-2 oxime compounds can be represented by the general formula:

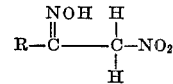

where R is a saturated alkyl radical having from one to 23 carbon atoms.

Thus, the 1-nitroalkanone-2 oxime compounds are really isomers of the 1-nitro-2-nitrosoalkanes defined above.

The monomeric 1-nitro-2-nitrosoalkanes defined above dimerize through the nitrogen atom of the nitroso group and the dimers have the formula:

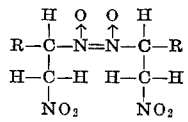

where R is as defined above. By a "1-nitro-2-nitrosoalkane" in this application is meant either the monomeric 1-nitro-2-nitrosoalkane defined above or the dimeric nitro-nitrosoalkanes defined above.

These dimeric nitro-nitrosoalkanes are called bis(1-nitro - 2-nitrosoalkanes) in the art. It is understood by those with ordinary skill in the art that nitrosoalkanes dimerize through the N atom of the nitroso group. Such terminology is used, for example, in U.S. Pat. No. 3,379,-710 to Alan F. Ellis; U.S. Pat. No. 3,009,965 to Moeller et al.; and in two articles by John F. Brown, Jr. entitled "The Infrared Spectra of Nitro and Other Oxidized Nitrogen Compounds" and "The Reaction of Nitric Oxide with Isobutylene" published in the Journal of the American Chemical Society, volume 77, pages 6341–6351, and volume 79, pages 2480–2488, respectively.

The 1-nitro-2-nitrosoalkanes can be prepared by any suitable procedure such as that disclosed in U.S. Pat. No. 3,379,710 to Alan F. Ellis issued on Apr. 23, 1968.

The 1-nitroalkanone-2 oximes can be prepared by isomerizing the 1-nitro-2-nitrosoalkanes. The isomerization of the 1-nitro-2-nitrosoalkanes preferably occurs in the presence of a solvent catalyst such as glacial acetic acid as more fully described in my copending U.S. Ser. No. 782,447, filed concurrently herewith and assigned to the same assignee as the subject file.

Suitable charge stocks, therefore, include the monomeric forms of the 1-nitroalkane charge stocks, namely the monomeric 1-nitro-2-nitrosoalkanes and the 1-nitroalkanone-2 oximes in addition to the dimeric 1-nitro-2-nitrosoalkanes known in the art as the bis(1-nitro-2-nitrosoalkanes).

It is believed, although it is not certain, that the reaction to form the desired products proceeds through the monomeric forms of the 1-nitroalkanes, and thus the monomeric 1-nitro-2-nitrosoalkane and 1-nitroalkanone-2 oxime forms of the charge stock are preferred. Additionally, the dimeric form of the 1-nitro-2-nitrosoalkanes is a solid, while the monomeric and oxime forms tend to be liquid and are thus easier to disperse in the reaction medium. This feature is important since the reaction is highly exothermic and gas is evolved. Thus, ease of dispersion of the charge stock in the reaction medium area aids in temperature control and overall smoothness of the reaction. However, the 1-nitro-2-nitrosoalkane is usually added in the form of the dimer which is believed to form the monomeric 1-nitro-2-nitrosoalkane before it reacts with the mineral acid.

Examples of suitable 1-nitroalkanes for use as charge stocks in the process of this invention include, but are not limited to:

bis(1-nitro-2-nitroso butane);
bis(1-nitro-2-nitroso pentene-4);
bis(1-nitro-2-nitroso hexane);
bis(1-nitro-2-nitroso hexene-5);
bis(1-nitro-1-ethyl-2-nitroso pentane);
bis(nitro-2-nitroso-4-methyl octane);
bis(1-nitro-2-nitroso decane);
bis(1-nitro-2-nitroso decene-9);
bis(1-nitro-2-nitroso dodecane);
bis(1-nitro-2-nitroso hexadecane);
bis(1-nitro-2-nitroso eicosane);
bis(1-nitro-2-nitroso pentacosane);
1-nitro-2-nitroso butane;
1-nitro-2-nitroso pentene-4;
1-nitro-2-nitroso hexane;
1-nitro-2-nitroso hexene-5;
1-nitro-1-ethyl-2-nitroso pentane;
1-nitro-2-nitroso-4-methyl octane;
1-nitro-2-nitroso decane;
1-nitro-2-nitroso decene-9;
1-nitro-2-nitroso dodecane;
1-nitro-2-nitroso hexadecane;
1-nitro-2-nitroso eicosane;
1-nitro-2-nitroso pentacosane;
1-nitrobutanone-2 oxime;
1-nitropentanone-2 oxime;
1-nitrohexanone-2 oxime;
1-nitro-4-methyloctanone-2 oxime;
1-nitrododecanone-2 oxime; and
1-nitropentacosanone-2 oxime.

The 1-nitroalkane charge stock defined above is converted to a reaction product comprising at least one compound selected from the group consisting of an alkyl nitrile, a fatty acid amide or a fatty acid, all having one less carbon atom than the monomeric forms of the 1-nitroalkane charge stock, by reaction of the 1-nitroalkane with aqueous sulfuric acid having an $H_2SO_4$ content relatively high so that the aqueous sulfuric acid will form a one phase reaction medium with the 1-nitroalkane. The charge stocks defined above are convertible to fatty acid amides having one less carbon atom by reaction with substantially anhydrous sulfuric or phosphoric acid as defined and claimed in my copending application Ser. No. 782,430, filed concurrently herewith. In the presence of aqueous sulfuric acid having the proper concentration, the reaction product has been found to comprise at least one of the compounds selected from the group consisting of fatty acids, fatty acid amides and alkyl nitriles, the amount of nitrile, amide and fatty acid depending on the particular charge stock and mineral acid concentration employed, the reaction conditions and, indeed, on the reaction procedure. While it is not certain, it is believed the initial reaction product is the fatty acid amide which then hydrolyzes to the fatty acid or dehydrates in the presence of concentrated sulfuric acid to the nitrile. Thus, it has been found that the higher sulfuric acid concentrations, lower temperatures and shorter contact times favor the recovery of the fatty acid amide. The formation of the fatty acid amide is believed to be so fast as to be a substantially instantaneous reaction under the temperatures of this reaction. The formation of the akyl nitrile and fatty acid are secondary reactions and are somewhat slower.

Further, it has been found that if the 1-nitroalkane charge stock and sulfuric acid are admixed at room temperature and heated to reaction temperature, increased amounts of nitrile are produced relative to fatty acid at lower mineral acid concentrations compared to a reaction procedure wherein the 1-nitroalkane is added slowly to a reaction medium comprising the sulfuric acid heated to reaction temperature.

On the other hand, the fatty acid forms in increasing amounts as the concentration of anhydrous mineral acid is decreased and as the reaction temperature and time are increased. The minimum $H_2SO_4$ concentration for the aqueous sulfuric acid should be that $H_2SO_4$ concentration which is sufficient to result in a one phase reaction medium with said 1-nitroalkane at 60° C. This minimum $H_2SO_4$ concentration for the aqueous sulfuric acid is about 65 weight percent or a molar ratio of anhydrous $H_2SO_4$ to water of at least 0.33:1. While it is not completely understood, it has been observed that when the weight percent $H_2SO_4$ content of the aqueous sulfuric acid is below about 65, the product of the reaction between the 1-nitroalkanes defined above and the sulfuric acid is primarily an alpha nitro-ketone, which alpha nitro-ketone is somewhat resistant to further hydrolysis in acid medium to an organic acid having one less carbon atom than the alpha nitro-ketone. Thus, it appears that a different mechanism is occurring depending upon the anhydrous $H_2SO_4$ concentration of the aqueous sulfuric acid. It has also been observed that when the concentration of the $H_2SO_4$ is above about 65 weight percent, the 1-nitroalkane charge stock of this invention appears to form a one phase reaction mixture with the strong mineral acid whereas at concentrations below about 65 weight percent, a two phase reaction mixture results. The difference in reaction products may, at least in part, be due to the difference in the solubility of the 1-nitroalkanes in the dilute or concentrated sulfuric acids.

It has also been found that aqueous phosphoric acid produces results similar to those obtained using aqueous sulfuric acid under the same concentration conditions except an alkylnitrile product has not been observed. This is probably because the phosphoric acid is not as good a dehydration medium. It was found, however, quite unexpectedly, that aqueous phosphoric acid appears to be a much better hydrolysis medium than sulfuric acid for the subject reaction. Thus, aqueous phosphoric acid having an anhydrous $H_3PO_4$ content of about 85 weight percent resulted in the conversion of 1-nitrodecanone-2 oxime to substantially only pelargonic acid with no amide or nitrile being detected, while the use of sulfuric acid in a similar concentration range resulted in nitrile plus fatty acid. The use of anhydrous phosphoric acid results in substantially only amide product as described in my copending application Ser. No. 782,430, filed concurrently herewith and mentioned above.

As noted above, the minimum anhydrous mineral acid content in the aqueous sulfuric and phosphoric acids employed in the process of this invention is that amount which will form a one phase reaction mixture with the 1- nitroalkane charge stock. Usually the concentration of anhydrous mineral acid is between about 65 and about 90 weight percent of the aqueous mineral acid. Higher concentrations of the anhydrous mineral acid in the aqueous solution of the mineral acid can be employed such as anhydrous mineral acid concentrations of 96 to 99 percent by weight of the aqueous mineral acid (a molar ratio of anhydrous mineral acid to water of from about 4:1 to 17:1) but the aqueous mineral acid must always contain sufficient water so that it is not substantially anhydrous; however, with decreasing amounts of water, increasing amounts of amide and decreasing amounts of fatty acid are formed. If a fatty acid is the desired product, the molar ratio of water to the 1-nitroalkane should be at least 1:1. Since the preferred molar ratio of mineral acid (on an anhydrous basis) to the 1-nitroalkane is about 1:1, the preferred anhydrous mineral acid concentration is about 84 weight percent of the aqueous mineral acid for both sulfuric and phosphoric acids.

The conversion of the monomeric 1-nitroalkane charge stocks to the desired products can be represented by the equation below:

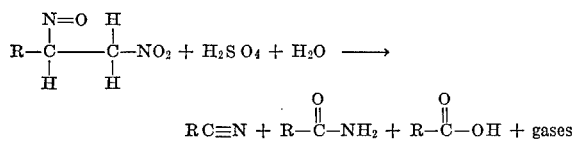

$$RC\equiv N + R-\overset{O}{\underset{\|}{C}}-NH_2 + R-\overset{O}{\underset{\|}{C}}-OH + gases$$

where R is as defined above.

It is understood that the 1-nitroalkanone-2 oxime would react similarly. If $H_3PO_4$ is substituted for the $H_2SO_4$, the products are the same except the $RC\equiv N$ is not produced. In all cases the desired products contain one less carbon atom than the monomeric forms of the 1-nitroalkane charge stock. Thus, 1-nitro-2-nitrosooctane, the dimer thereof, or 1-nitrooctanone-2 oxime can produce a reaction product containing at least one of the compounds 1-heptanitrile; heptanoic acid or heptamide. The amount of each product depends on reaction conditions and procedure, as noted above.

Examples of alkyl nitriles which can be produced include, but are not limited to, butanitrile; hexanitrile; 3-ethylheptanitrile; decanitrile; hexadecanitrile; and pentacosanitrile.

Examples of fatty acid amides which can be produced include, but are not limited to, butyramide; valeramide; heptamide; pelargonamide; and hexadecanamide.

Examples of fatty acids which can be produced include, but are not limited to butanoic acid, pentanoic acid, pelargonic acid, decanoic acid, hexadecanoic acid, and eicosanoic acid.

The 1-nitroalkane charge stocks of this invention can be reacted with the aqueous mineral acid, i.e. sulfuric or phosphoric, in any suitable manner. For example, the 1-nitroalkane and mineral acid can be admixed at room temperature and heated to reaction temperature, preferably only in the presence of a diluent as defined below, or the 1-nitroalkane can be added to a reaction medium comprising the heated aqueous mineral acid. It is not preferred to heat the 1-nitroalkane and add the aqueous mineral acid thereto since the 1-nitroalkane charge materials are subject to thermal degradation resulting in the production of unwanted side products, such as 1-nitroolefins, and reaction would not occur until the weight percent mineral acid was sufficiently high, at which point the reaction would tend to be violent since gases such as $CO_2$ and $N_2$ are evolved at the temperatures of the reaction. The reaction can also be run in a continuous manner by admixing a stream of the aqueous mineral acid of the desired concentration with a stream of the 1-nitroalkane charge stock in a reactor such as a coil reactor under appropriate reaction conditions to produce the desired products.

The molar ratio of the mineral acid, based on the anhydrous mineral acid, to the monomeric form of the 1-nitroalkane is suitably from about 1:1 to about 50:1 with preferred molar ratios from 1:1 to 15:1. The most preferred molar ratios are from 0.98:1 to 2:1. At molar ratios below about 1:1, the conversion of the 1-nitroalkane would be incomplete while the molar ratios above 2:1 to 5:1 serve no additional purpose except to solubilize the charge stock and products.

Optionally, a diluent lower alkyl fatty acid which is inert to the action of the mineral acid and which is mutually soluble with the mineral acid, the charge stock and products can be employed. By a lower alkyl fatty acid is meant formic, acetic and propionic acids. The purpose of the diluent fatty acid is to reduce the viscosity of the reaction medium, particularly if the more concentrated sulfuric and phosphoric acids are employed; to reduce the need for a large excess of mineral acid to serve as a reaction medium; and to serve as a heat sink temperature control means for the exothermic reaction. The amount of the lower alkyl fatty acid to employ should be such that it does not interfere with the production of the desired fatty acids, fatty acid amides and alkyl nitriles. Generally, the amount of diluent lower alkyl fatty acid to employ will vary, but amounts from 0 to 95 weight percent of the reaction medium are suitable. By the "reaction medium" is meant the total weight of the mineral acid, water and diluent lower alkyl fatty acid exclusive of the 1-nitroalkane charge stock. When the molar ratio of $H_2SO_4$ or $H_3PO_4$ to water in the reaction medium is greater than about 1.6:1 (a concentration of $H_2SO_4$ or $H_3PO_4$ greater than 90 weight percent based on a diluent free reaction medium), the amount of diluent fatty acid can be as great as 95 weight percent of the reaction medium but is usually from 5 to 75 percent of the reaction medium. Too great an amount of diluent fatty acid merely takes up needed reactor space and thus reduces the space-time yield of desired products. In general, that amount of diluent fatty acid should be employed which results in the desired viscosity reaction medium and provides a suitable heat sink based on the economies of the situation. As the molar ratio of $H_2SO_4$ or $H_3PO_4$ to water decreases to the point where a two phase reaction mixture results between the mineral acid and 1-nitroalkane charge stock on a diluent free basis, the amount of diluent fatty acid which can be tolerated is correspondingly decreased. Thus, when the molar ratio of $H_2SO_4$ or $H_3PO_4$ to water is about 0.7:1 (about 80 weight percent anhydrous mineral acid based on a diluent free reaction medium), a suitable range of diluent concentration is from 0 to 20 weight percent of the 1-nitroalkane free reaction medium. When the molar ratio of the anhydrous mineral acid to water is about 0.4:1 (70 percent anhydrous mineral acid), the amount of diluent fatty acid is usually from 0 to 10 weight percent of the 1-nitroalkane free reaction mixture.

The reaction temperature is not critical, but it is desirable to effectuate the conversion of the 1-nitroalkanes to the desired product as quickly as possible and to remove the organic reaction product containing the fatty acid, fatty acid amide and alkyl nitrile from the presence of the strong mineral acid as quickly as possible or at least to change the conditions in the reaction medium so as to inhibit any further reaction between the organic reaction product and the strong mineral acid in order to avoid any subsequent conversion of the organic reaction product with the strong mineral acid to undesired by-products such as polymers, nitroolefins, etc. Suitable reaction temperatures are from 60° to 160° C. and the preferred reaction temperatures are from 80° to 120° C. At temperatures less than about 75° C. the reaction is somewhat slower than is desired although temperatures as low as 60° C. can be employed, while temperatures above 160° C. should be avoided since such high temperatures promote decomposition of the product.

The reaction pressure is also not critical, but atmospheric pressure operation is preferred for equipment simplification reasons. The pressure should, of course, be sufficient to maintain the reactants in the liquid phase. Thus, if the higher temperature operation is desired, pressurized equipment may be necessary to maintain the diluent fatty acid in the liquid phase if a diluent is employed. A suitable range of operating pressures is between 0 and 200 p.s.i.g., but atmospheric pressure is preferred.

As noted above, the reaction of the 1-nitroalkane charge stocks to form the fatty acid amides is very fast. In the presence of the aqueous strong minerals acids, these fatty acid amides are immediately subjected to hydrolysis to form the desired fatty acid having one less carbon atom than the monomeric forms of the 1-nitroalkane charge stock. The shorter the reaction time the higher the percentage of amide which will be recovered in the reaction product. At increased reaction times, and especially at the more dilute acid concentrations within the range defined above, the greater will be the percentage of fatty acid found in the product. Suitable reaction times are from one second to 120 minutes, with the preferred reaction times being between one and 30 minutes.

The desired reaction products can be recovered by any suitable procedure. One suitable procedure involves cooling the reaction mixture by dilution with cold water. Sufficient cold water should be employed to cause a phase separation. The mineral acid will pass into the aqueous phase while the organic reaction products will form a separate phase which can be separated from the aqueous phase and further treated, if desired, to recover the formed reaction products. The reaction product mixture can be indirectly cooled before being diluted with cold water or the reaction product can be poured onto crushed ice and stirred in a blender type apparatus to reduce the reaction temperature more quickly so as to inhibit any further hydrolysis of the amide and nitrile products, if such amide and nitrile products are the desired reaction products.

The invention will be further described with reference to the following experimental work.

In all of the experimental work the nitroalkane charge stock was either a $C_6$ or $C_8$ nitro-nitroso dimer which was prepared by the reaction of $N_2O_3$ with either hexene-1 or octene-1 as described below, or the charge stock was the oxime form of the monomeric form of the dimer. A typical example for the preparation of the dimer charge stock is as follows:

Gaseous $N_2O_3$ was bubbled through four moles of octene-1 held at 36° C. for one hour, at which time 0.66 mole of $N_2O_3$ had been added. The stoichiometric ratio of effective nitrogen oxides to olefin was 0.66:4 or 0.165. The weight of solid dimer isolated by filtration was 89 grams. The $N_2O_3$ was completely consumed and the mole percent conversion of octene-1 based on the $N_2O_3$ was 16.5 percent. The efficiency of the reaction to the formation of dimer is therefore 72 percent, that is, 0.66 mole or 124 grams of monomer (in the form of dimer) was expected and 89 grams were isolated.

Analysis showed the dimer to have the empirical formula $C_8H_{15}N_2O_3$. On melting, the dimer formed a greenish-blue liquid which is characteristic of a 1-nitro-2-nitrosoalkane monomer. The melting point of the dimer was about 94.5° C. The infrared band spectra were the same as those published by J. F. Brown, Jr., in the Journal of the American Chemical Society, volume 77, page 6341, 1955, for an octene-1 nitro-nitroso dimer.

The oxime forms of the bis(1-nitro-2-nitroso hexane) and bis(1-nitro-2-nitroso octane) were prepared by heating the bis compounds in excess glacial acetic acid for about 20 minutes at 100° C. until the characteristic yellow color of the oxime is observed and subsequently isolating the oxime by diluting the reaction medium with water.

EXAMPLE 1

In the run for this example, five grams (0.03 mole) of the octene-1 nitro-nitroso dimer described above were added to 50 grams of sulfuric acid having an $H_2SO_4$ content of 80 weight per cent, and the temperature was raised to 95° C. and maintained at that temperature for one minute. The molar ratio of anhydrous sulfuric acid to the nitro-nitroso compound was about 13. The dimer melted and went into solution in the sulfuric acid at about 95° C. The reaction mixture, after one minute, was cooled quickly to 40° C. to prevent charring. The mixture was then diluted with water and analysis of the organic phase showed that 33 percent of the dimer had been converted to 1-heptanitrile and 33 percent of the dimer had been converted to heptanoic acid. No dimer charge material was recovered. The remainder of the product was a brownish tar which was not further analyzed.

EXAMPLE 2

In the run for this example, 28 millimoles of bis(1-nitro-2-nitroso hexane) was added with stirring slowly (5 to 10 minutes) to 30 grams of sulfuric acid having an $H_2SO_4$ content of 80 percent while the sulfuric acid was maintained at a temperature of 100° C. After the addition of the charge stock the temperature was maintained for an additional five minutes at reaction temperature followed by cooling of the reaction mixture to 40° C. The cooled reaction mixture was poured into 115 milliliters of water and ice at 0° C. The organic products were isolated, and analysis showed the organic products were composed of 50 percent valeric acid and 50 percent valeramide by gas-liquid chromatography (GLC).

EXAMPLE 3

Example 2 was repeated except sulfuric acid having an $H_2SO_4$ content of 96 percent was employed. The organic product analyzed 20 percent valeronitrile, 30 percent valeric acid and 50 percent valeramide by gas-liquid chromatography (GLC).

A comparison of Examples 2 and 3 shows that by adding the nitro-nitroso dimer to 80 percent sulfuric acid, less nitrile is obtained than when using a 96 percent sulfuric acid (Example 3) or by utilizing the procedure of Example 1 above.

EXAMPLE 4

Example 2 was repeated except 1-nitrohexanone-2 oxime was employed as the charge stock in place of bis(1-nitro-2-nitroso hexane). Substantially the same results were obtained.

A comparison of Examples 2 and 4 shows that the use of the dimer or oxime forms of the nitroalkane charge stocks of this invention produces substantially the same results.

EXAMPLE 5

Example 3 was repeated except the 1-nitrohexanone-2 oxime was employed in place of the bis(1-nitro-2-nitroso hexane). The organic product analyzed less than four percent valeronitrile, 26 percent valeric acid and 70 percent valeramide by GLC.

A comparison of Examples 3 and 5 shows that the results are quite similar.

EXAMPLE 6

60—Norris A. Bucksell—11899—Day Patents—May 28

Example 4 was repeated except the sulfuric acid had an $H_2SO_4$ content of 70. Analysis of the reaction product showed 80 percent valeric acid and 20 percent valeramide.

EXAMPLE 7

Example 1 was repeated except the weight percent $H_2SO_4$ in the aqueous sulfuric acid was 70. The dimer did not go into solution at 100° C. where it was melted, and a violet reaction producing only a brown tar was obtained on attempted mixing.

A comparison of Examples 6 and 7 shows that an aqueous sulfuric acid containing 70 percent by weight $H_2SO_4$ is satisfactory for the slow addition of the 1-nitroalkane charge stock (1-nitrohexanone-2 oxime) (Example 6) but not for the admixture of the entire 1-nitroalkane charge stock and mineral acid at room temperature followed by heating to reaction temperature (Example 7). Small amounts of the charge stock where apparently soluble with the mineral acid as added, and the charge stock at reaction temperature reacted substantially as quickly as it was added to give reaction products which were soluble in the 70 percent sulfuric acid reaction medium. In addition, the 1-nitroalkane charge stock in Example 6 was the liquid oxime form of the charge stock which tends to be more easily dispersed in the aqueous mineral acid.

EXAMPLE 8

Example 4 was repeated except 85 percent phopshoric acid was used in place of the 80 percent sulfuric acid. The organic reaction product was substantailly only valeric acid.

A comparison of Examples 4 and 8 shows that the phosphoric acid is, for some unknown reason, a better hydrolysis medium than the sulfuric acid since the product from Example 8 indicated that all of the amide had been hydrolyzed to valeric acid.

EXAMPLE 9

In the run for this example, 2.7 grams of sulfuric acid having an $H_2SO_4$ content of 96 percent; 0.4 gram of water; and 23 grams of glacial acetic acid were admixed. The molar ratio of $H_2SO_4$ to water was about 1:1. The weight percent of anhydrous $H_2SO_4$ in the reaction medium was about ten. To this was added 4.7 grams of bis(1-nitro-2-nitrosooctane). The molar ratio of the monomeric 1-nitro-2-nitrosooctane to $H_2SO_4$ (anhydrous) to water was 1:1.1:1.1.

On warming, a blue-green solution was formed and the solution was heated to 60° C. After about 10 to 15 minutes, the color of the solution changed to an orangish-brown hue. The solution was maintained at 60° C. for a total of 60 minutes after which the solution was cooled and diluted with water to form two phases. Analysis of the organic phase showed the presence of heptanitrile and heptanoic acid in approximately equal amounts.

EXAMPLE 10

In the run for this example, 4.8 grams of sulfuric acid having an $H_2SO_4$ content of 96 percent was admixed with 45 grams of glacial acetic acid so that the weight percent $H_2SO_4$ (anhydrous) in the reaction medium was about ten. The molar ratio of the $H_2SO_4$ to the water in the reaction medium was about 5:1. The mixture was heated to about 100° C. and 5 grams of bis(1-nitro-2-nitrosooctane) were added slowly over a period of two to three minutes with stirring. An exothermic reaction occurred and gas evolution was observed. The temperature increased to about 120° C. and the color of the mixture took on a brownish hue. The mixture was permitted to remain in a 100° C. oil bath for 15 minutes.

The product was then cooled to room temperature and diluted with water to form two phases. Analysis of the organic phase gave results similar to those of Example 9 above except somewhat greater amounts of heptanitrile were produced.

A comparison of Examples 9 and 10 shows that as the ratio of $H_2SO_4$ to water increases in the reaction medium, greater amounts of the nitrile product are formed. Examples 9 and 10 also show that nitrile and acid can be produced using very low concentrations of sulfuric acid in the reaction medium (10 percent).

That the lower alkyl acids are unique as diluents in the process of the subject invention is shown in Example 11 below where the use of acetone in lieu of the acetic acid of Example 9 resulted in the production of 1-nitrooctanone-2 rather than a nitrile, fatty acid or fatty acid amide.

EXAMPLE 11

Example 9 was repeated except 11 grams of acetone were employed in place of the glacial acetic acid. The weight percent anhydrous $H_2SO_4$ in the reaction medium was about 18.

13.7 grams of 1-nitrooctanone-2 was crystallized out of the organic phase by precipitation with hexane. No nitrile was produced and only very small amounts of acid.

A comparison of Examples 9-11 shows the type of diluent is critical to obtain the products of this reaction, acetic acid giving the nitrile plus acid while the acetone results substantially only in the production of the 1-nitroketone under these conditions.

If a fatty acid is the desired reaction product when sulfuric acid is employed, a preferred method of procedure is to initially form the amide at a fast rate of reaction by adding the 1-nitroalkane to a reaction medium containing aqueous sulfuric acid in the concentration range defined above, followed, preferably immediately, after the addition of the 1-nitroalkane by the addition of sufficient water to form a second reaction medium and decrease the anhydrous mineral acid content of the aqueous mineral acid to less than 65 weight percent and heating the resulting second reaction medium to a temperature and for a time sufficient to convert the first reaction product to the desired fatty acid. The immediate dilution of the mineral acid will reduce the tendency for further reaction of the organic materials in the reaction medium with a more concentrated mineral acid to the undesired brown tar-like products.

It is preferred to dilute the first stage reaction product within one second to five minutes after addition of the 1-nitroalkane charge stock. It is further preferred to add sufficient water so that the aqueous sulfuric acid has an $H_2SO_4$ content from 5 to 50 weight percent, more preferably an $H_2SO_4$ content from 10 to 30 weight percent.

The reaction temperature for heating the second reaction medium is suitably from 60° to 100° C. Higher temperatures would require the use of pressures to maintain the water in the liquid phase, in which case, higher temperatures up to 120° C. can be employed. The preferred reaction pressure is atmospheric, but increased pressures up to 100 p.s.i.g. can be used, if desired, to keep the reactants in the liquid phase. The reaction time for the second stage reaction is suitably from 30 minutes to five hours or more, preferably from one to two hours.

If desired, a diluent inert solvent can be added to the second stage in amounts sufficient to obtain and maintain the reaction medium in one phase.

This embodiment of the invention will be illustrated by Example 12 below.

EXAMPLE 12

In the run for this example, 18.8 grams (0.1 mole) of 90 percent pure 1-nitrooctanone-2-oxime was added slowly (20 minutes) to 20 grams of sulfuric acid having an $H_2SO_4$ content of 96 percent at 100° C. with vigorous stirring.

When the addition was complete, the reaction mixture was immediately cooled to a temperature of 70° C. and was diluted with 40 milliliters of water. The $H_2SO_4$ content was thus 33 weight percent. This diluted reaction mixture was then heated at reflux for 1.5 hours.

The resulting product was cooled, and 13 grams of dried organic product was recovered. This was distilled to give 10 grams of an overhead product. Gas-liquid chromatographic analysis of the overhead product showed that it contained 80 percent heptanoic acid. The efficiency of the overall process to the production of heptanoic acid was about 68 percent, based on the theoretical amount which could have been produced.

Resort may be had to such variations and modifications as fall within the spirit of the invention and the scope of the appended claims.

I claim:

1. A process for the preparation of a product comprising at least one organic compound having from 2 to 24 carbon atoms selected from the group consisting of a fatty acid, a fatty acid amide and an alkyl nitrile which process comprises heating at a temperature of from 60°–160° C. a 1-nitroalkane having from 3 to 25 carbon atoms selected from the group consisting of a 1-nitro-2-nitrosoalkane having a hydrogen atom on the beta carbon atom and a 1-nitroalkanone-2 oxime in the contact presence of aqueous sulfuric acid having an $H_2SO_4$ content such that said sulfuric acid forms a one phase reaction medium with said 1-nitroalkane.

2. A process in accordance with claim 1 wherein the aqueous sulfuric acid has an $H_2SO_4$ content from 65 to 99 weight percent.

3. A process according to claim 2 wherein the 1-nitroalkane has a formula selected from the group consisting of:

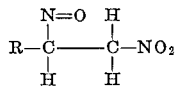

where R is a saturated alkyl radical having from 1 to 23 carbon atoms;

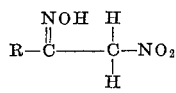

where R is as defined; and

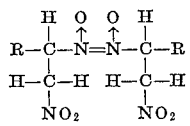

where R is as defined; and wherein the 1-nitroalkane is added to a reaction medium comprising said aqueous sulfuric acid maintained at a reaction temperature from 60° to 160° C.

4. A process which comprises:
reacting at least one 1-nitroalkane having from 3 to 25 carbon atoms selected from the group consisting of a 1-nitro-2-nitrosoalkane having a hydrogen atom on the beta carbon atom and a 1-nitroalkanone-2 oxime under reaction conditions including a temperature from about 60° to about 160° C.
with an aqueous mineral acid selected from the group consisting of $H_2SO_4$ and $H_3PO_4$,
in a reaction medium comprising said aqueous mineral acid and wherein said reaction medium the concentration of the anhydrous mineral acid content of said aqueous mineral acid is at least sufficient to form a one phase reaction medium with said 1-nitroalkane,
to produce a reaction product when sulfuric acid is selected comprising at least one organic compound having from 2 to 24 carbon atoms selected from the group consisting of an alkyl nitrile, a fatty acid and a fatty acid amide or to produce a reaction product when phosphoric acid is selected comprising at least one organic compound having from 2 to 24 carbon atoms selected from the group consisting of a fatty acid and a fatty acid amide.

5. A process according to claim 4 wherein the aqueous mineral acid is $H_3PO_4$ and the reaction product comprises at least one organic compound having from 2 to 24 carbon atoms selected from the group consisting of a fatty acid and a fatty acid amide.

6. A process according to claim 4 where the reaction medium comprises in addition a diluent consisting of a fatty acid having from 1 to 3 carbon atoms.

7. A process according to claim 6 wherein the fatty acid is acetic acid.

8. A process according to claim 7 wherein the 1-nitroalkane is added to the heated reaction medium comprising the aqueous mineral acid and acetic acid at a rate substantially as fast as it is reacted.

9. A process for the preparation of a reaction product comprising at least one organic compound having 2 to 24 carbon atoms selected from the group consisting of an alkyl nitrile, a fatty acid and a fatty acid amide, which process comprises
reacting at least one 1-nitroalkane having from 3 to 25 carbon atoms selected from the group consisting of a 1-nitro-2-nitrosoalkane having a hydrogen atom on the beta carbon atom and a 1-nitroalkanone-2 oxime with aqueous sulfuric acid having an $H_2SO_4$ content of at least 65 weight percent,
in a reaction medium comprising said sulfuric acid under reaction conditions including a temperature from about 60° to about 160° C.

10. A process according to claim 9 wherein the reaction medium comprises in addition a diluent consisting of a fatty acid having from 1 to 3 carbon atoms.

11. A process according to claim 10 wherein the fatty acid is acetic acid.

12. A process for the preparation of a reaction product comprising at least one organic compound having from 2 to 24 carbon atoms selected from the group consisting of a fatty acid and a fatty acid amide, which process comprises:
reacting at least one 1-nitroalkane having from 3 to 25 carbon atoms selected from the group consisting of a 1-nitro-2-nitrosoalkane having a hydrogen atom on the beta carbon atom and a 1-nitroalkanone-2 oxime with aqueous phosphoric acid having an $H_3PO_4$ content of at least 65 weight percent,
in a reaction medium comprising said phosphoric acid under reaction conditions including a temperature from about 60° to about 160° C.

13. A process for the preparation of a fatty acid having from 2 to 24 carbon atoms which comprises:
adding a 1-nitroalkane having from 3 to 25 carbon atoms selected from the group consisting of a 1-nitro-2-nitrosoalkane having a hydrogen atom on the beta carbon atom and a 1-nitroalkanone-2 oxime
to a reaction medium comprising an aqueous mineral acid selected from the group consisting of sulfuric and phosphoric to form a first reaction product at a temperature of from 60° to 160° C. for a time from 1 second to 120 minutes and wherein said reaction medium the anhydrous mineral acid concentration of said aqueous mineral acid is at least 65 weight percent, and thereafter
adding a sufficient amount of water to the first reaction medium to form a second reaction medium and decrease the anhydrous mineral acid content of the aqueous mineral acid to less than 65 weight percent and
heating said second reaction medium at a temperature and for a time sufficient to convert said first reaction product to the desired fatty acid.

14. A process according to claim 13 wherein the mineral acid is sulfuric acid used in a first reaction medium concentration between 65 and 90 weight percent and in a second reaction medium concentration between 10 and 30 weight percent.

References Cited

UNITED STATES PATENTS

| | | | |
|---|---|---|---|
| 2,113,812 | 4/1938 | Lippincott | 260—540 |
| 3,341,554 | 9/1967 | Murray et al. | 260—465.1 |
| 3,379,710 | 4/1968 | Ellis | 260—688 |
| 3,385,880 | 5/1968 | Abbott | 260—465.1 |

FOREIGN PATENTS

| | | | |
|---|---|---|---|
| 603,719 | 8/1960 | Canada | 260—413 |
| 1,039,051 | 9/1958 | Germany | 260—413 |

OTHER REFERENCES

Brown Jr., "The I.R. Spectra of $NO_2$ and Other Oxidized Nitrogen Compounds."

LEWIS GOTTS, Primary Examiner

G. HOLLRAH, Assistant Examiner

U.S. Cl. X.R.

260—413, 465.1, 540, 561R, 566A

PO-1050
(5/69)

UNITED STATES PATENT OFFICE
CERTIFICATE OF CORRECTION

Patent No. 3,586,704            Dated      June 22, 1971

Inventor(s) Alan F. Ellis

It is certified that error appears in the above-identified patent and that said Letters Patent are hereby corrected as shown below:

Col. 3, line 32, "bis(nitro-2-nitroso-4-methyl octane)"
                should read
         --bis(1-nitro-2-nitroso-4-methyl octane)--.

Col. 6, line 13, "reduct" should be --reduce--.

Col. 7, line 9, "minerals" should be --mineral--.

Col. 8, line 58, "60-Norris A. Bucksell-11899-Day Patents-May 28"
          should be deleted.

Col. 8, line 67, "violet" should be --violent--.

Col. 9, line 1, "where" should be --were--.

Col. 9, about line 10, "phopshoric" should be --phosphoric--.

Signed and sealed this 16th day of May 1972.

(SEAL)
Attest:

EDWARD M. FLETCHER, JR.           ROBERT GOTTSCHALK
Attesting Officer                 Commissioner of Patents